United States Patent
Baumert et al.

(10) Patent No.: US 6,571,897 B2
(45) Date of Patent: Jun. 3, 2003

(54) VEHICLE WITH A FUEL CELL SYSTEM AND METHOD FOR OPERATING THE SAME

(75) Inventors: Rob Baumert, San Diego, CA (US); Craig Greenhill, Richmond (CA); Henry H. Voss, West Vancouver (CA); Brian Wells, Vancouver (CA)

(73) Assignees: Ballard Power Systems AG, Kirchheim (DE); Ballard Power Systems, Inc., Burnaby (CA)

( * ) Notice: Subject to any disclaimer, the term of this patent is extended or adjusted under 35 U.S.C. 154(b) by 0 days.

(21) Appl. No.: 09/927,917

(22) Filed: Aug. 13, 2001

(65) Prior Publication Data

US 2003/0029650 A1 Feb. 13, 2003

(51) Int. Cl.[7] .............................. B60K 1/00; B60K 6/00; H01M 8/12; F25B 13/00
(52) U.S. Cl. ....................... 180/65.1; 180/65.2; 429/26; 62/324.6
(58) Field of Search .............................. 180/65.1, 65.2, 180/65.3, 65.4, 53.1, 53.5, 53.8; 62/238.6, 239, 241, 243, 244, 323.1, 7, 183, 201; 60/668, 670; 429/26, 9, 19, 17, 20, 30

(56) References Cited

U.S. PATENT DOCUMENTS

| | | | | |
|---|---|---|---|---|
| 4,362,789 A | * | 12/1982 | Dighe | 429/17 |
| 4,377,074 A | * | 3/1983 | Jardine | 62/183 |
| 4,593,534 A | * | 6/1986 | Bloomfield | 62/201 |
| 5,679,410 A | * | 10/1997 | Fujita et al. | 62/7 |
| 5,780,179 A | | 7/1998 | Okamoto | 429/20 |
| 5,900,329 A | * | 5/1999 | Reiter et al. | 429/17 |
| 6,276,473 B1 | * | 8/2001 | Zur Magede | 180/65.2 |
| 6,278,637 B1 | * | 4/2002 | Ono et al. | 180/65.3 |
| 6,365,290 B1 | * | 4/2002 | Ghezel-Ayagh et al. | 429/20 |
| 6,370,903 B1 | * | 4/2002 | Wlech | 62/324.6 |
| 6,408,966 B1 | * | 6/2002 | Benz et al. | 180/65.1 |
| 6,428,915 B1 | * | 8/2002 | Ban et al. | 429/13 |
| 6,432,568 B1 | * | 8/2002 | Salvador et al. | 429/19 |
| 2001/0028972 A1 | * | 10/2001 | Autenrieth et al. | 429/26 |

FOREIGN PATENT DOCUMENTS

| | | | | |
|---|---|---|---|---|
| JP | 404337251 A | * | 11/1992 | 429/17 |
| JP | 405347161 A | * | 12/1993 | 429/17 |
| JP | 410311564 A | * | 11/1998 | 62/7 |

\* cited by examiner

*Primary Examiner*—Brian L. Johnson
*Assistant Examiner*—G B Klebe
(74) *Attorney, Agent, or Firm*—Crowell & Moring LLP

(57) ABSTRACT

A vehicle includes a traction unit capable of delivering mechanical power for driving the vehicle; electric loads; and a fuel cell system for supplying the electric loads with electric power. The fuel cell system includes a fuel cell stack with an anode input line, an anode exhaust line, a cathode input line, and an cathode exhaust line. A compression/expansion loop is employed in the cathode exhaust line. The expansion side of the compression/expansion loop is in thermal contact with the cathode exhaust to cool the cathode exhaust and to transfer the heat of the exhaust to the compression side of the compression/expansion loop at a higher temperature level. A water separator is arranged in the cathode exhaust line for collecting water vapor of product water that is carried in the cathode exhaust and is recycled to the fuel cell system.

14 Claims, 2 Drawing Sheets

VEHICLE WITH A FUEL CELL SYSTEM AND METHOD FOR OPERATING THE SAME

BACKGROUND AND SUMMARY OF INVENTION

The present invention relates to a vehicle with a fuel cell system including a fuel cell stack with an anode input line; an anode exhaust line; a cathode input line; and a cathode exhaust line.

U.S. Pat. No. 5,780,179 discloses a fuel cell system for use in a vehicle powered by the fuel cell system. Water is used for the steam reforming reactions performed in a reformer and for humidifying the ion exchange membrane of the fuel cell stack. Gas-liquid separators are used for water recovery from cathode and anode exhausts of the fuel cell stack. The recovered water is fed back to a water storage tank. The fuel cell-stack exhibits a fuel gas utilization ratio which is sufficient to cause an amount of product water discharged in the fuel cell exhaust to at least equal the amount of water being supplied to the fuel cell stack and to the reformer. This can be achieved, for example, by using air compression in high power systems so that the fuel cell is pressurized and exhibits a high fuel gas utilization. Water balance is maintained so that there is no need for an additional water supply from outside the fuel cell system.

When a fuel cell system is used as an auxiliary power unit at low power ranges, major problems for weight, volume, efficiency, complexity, and noise are created.

An aspect of the present invention is to improve the water recovery process in a vehicle-based low pressure fuel cell system.

This aspect may be achieved by a vehicle according to the present invention.

The present invention allows a low pressure fuel cell system to be operated with a water balance so that no additional water has to be supplied from outside the vehicle.

Other objects, advantages and novel features of the present invention will become apparent from the following detailed description of the invention when considered in conjunction with the accompanying drawings.

DETAILED DESCRIPTION OF THE DRAWINGS

The present invention can be advantageously used in motor vehicles where a fuel cell system is used as an auxiliary power unit that supplies electric power for low power requirements. Advantageously, the present invention can be used in trucks with high power engines usually idling for extended periods of time to meet their low power requirements via an alternator.

Figure 1:
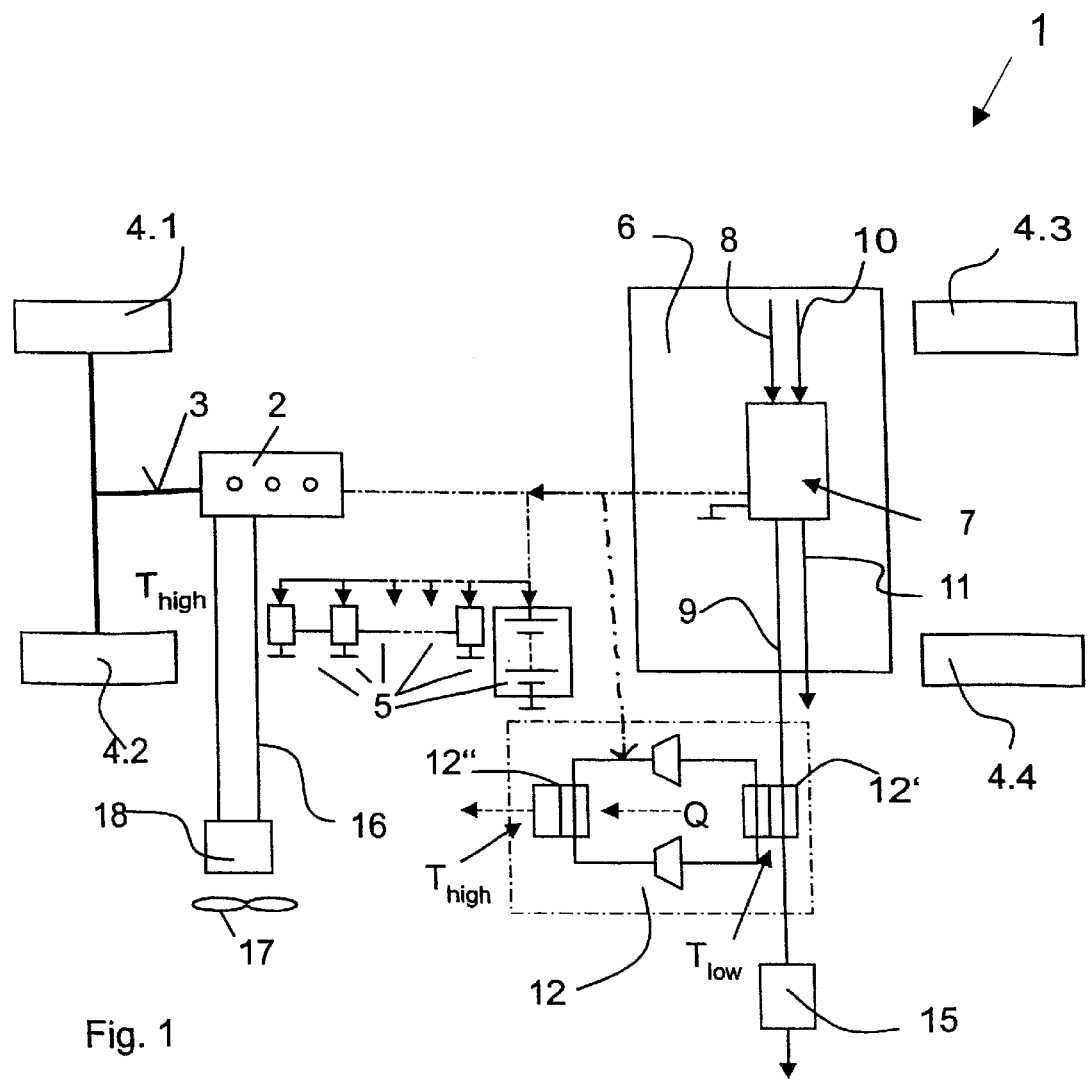
FIG. 1 shows a schematic diagram of an embodiment of a vehicle with a combustion engine and a fuel cell system according to the present invention.

FIG. 1 shows a schematic view of a vehicle according to the present invention. A vehicle 1 comprises four wheels 4.1, 4.2, 4.3, 4.4 and attraction unit 2 which is capable of delivering mechanical power for driving at least one wheel drive shaft 3 with driving wheels 4.1, 4.2. The vehicle also comprises electric loads 5, which may include an electric storage medium such as a battery. The traction unit 2 is preferably a combustion engine. When the engine is running, the electrical loads 5 can be powered by the engine power via an alternator (not shown). The electrical connections are indicated by dashed lines.

The vehicle 1 also comprises a fuel cell system 6 for supplying electric power to said electric loads 5. The fuel cell system 6 is preferably used as auxiliary power unit supplying the electric loads 5 with electric power in times when the traction unit 2 is not running. The fuel cell system 6 can also be used to supply electric power to the electric loads 5 while the engine 2 is running. The auxiliary power unit (APU) is a compact unit capable of delivering moderate electric power that is much lower than the electric power provided by a fuel cell system for traction applications. It is cheaper and weighs less than a fuel cell system for traction purposes.

The fuel cell system 6 is not shown in detail. It may include (1) a reforming system for producing a hydrogen-rich reformate stream, and (2) a gas cleaning system for removing impurities from the hydrogen rich-reformate, as is well known to persons skilled in the art of fuel cell systems. Preferably, the fuel cell is a low pressure fuel cell. The fuel cell system 6 can be run on a fuel selected from the group of alcohols, ethers, carbon hydrates, hydrogen or other fuels suitable for fuel cells. The fuel used for the fuel cell system 6 may be the same fuel as used for the combustion engine, for example, such as gasoline or diesel.

The fuel cell system 6 includes a fuel cell stack 7 with an anode fuel input 10, an anode exhaust line 11, a cathode input line 8, and a cathode exhaust line 9. The anode fuel, preferably pure hydrogen, is supplied via the anode input line 10 and the anode exhaust is removed from the fuel cell stack 7 via the exhaust line 11. Preferably, air is supplied to the cathode via a cathode input line 8 and the cathode exhaust, mainly water and excess oxygen, is removed from the stack via exhaust line 9.

The fuel cell stack 7 comprises a multiplicity of individual fuel cells stacked together to form a single unit so that the fuel cell stack 7 is capable of delivering electrical power to power the electrical loads 5 in the vehicle 1. The electrical connections are indicated by dashed lines.

If the fuel cell stack 7 comprises fuel cells that are equipped with a polymer electrolyte membrane (PEM), the processing temperature of the fuel cell stack 7 is relatively low. A typical temperature is less than 100° C., usually between 70° C. and 80° C. For fuel cell systems used in a vehicle, a key problem is that the heat produced by the fuel cell stack 7 or carried by the exhaust lines 9, 11 of the fuel cell stack 7 is at a temperature significantly above the ambient temperature.

If a gas-liquid separator is used in the fuel cell exhaust lines 9, 11, usually only the liquid water is collected, whereas water vapor is lost if the exit temperature in the exhaust lines 9, 11 is near the boiling point of water.

According to the present invention, the fuel cell system 6 is equipped with a low pressure compression/expansion loop 12 which acts as a cooling system to reduce the temperature of the cathode exhaust at low pressure to levels where water balance is maintained. There is no need to pressurize the fuel cell for water balance.

Preferably, the cathode exhaust line 9 is cooled by the expansion side of a compression/expansion loop 12 as most of the product water which is formed by the oxidation of hydrogen inside the fuel cell 7 is carried away by the cathode exhaust. It is also possible to employ a compression/expansion loop 12 for the anode exhaust 11, too. This can be a separate unit of the loop employed in the cathode exhaust line 9 that is used for both lines 9, 11. The compression/expansion loop 12 performs compression/expansion cycles with a refrigerant and exhibits a cold side at its expansion side ($T_{low}$) and a hot side at its compression side ($T_{high}$). The refrigerant is cooled in the expansion cycle and heated in the compression cycle. This means that the cold expansion side of the loop 12 draws heat at a low temperature $T_{low}$ and the hot compression side delivers heat at a high temperature $T_{high}$. Preferably the heat is drawn from the cathode and/or anode exhaust in the exhaust lines 9, 11 and the heat removed from the compression/expansion loop 12 is preferably delivered to the ambient.

By cooling the cathode exhaust with the expansion side of the compression/expansion loop 12, the product water produced by the fuel cell stack 7 as water vapor and carried away by the cathode exhaust is cooled effectively to very low temperatures. Most of the water vapor is liquified and can be collected in a water separator 15 and recycled to the fuel cell system 6.

The expansion side of the compression/expansion loop 12 is in thermal contact with the warm cathode exhaust in the cathode exhaust line 9 of the fuel cell stack 7 and the exhaust is cooled by thermal conduction by the cold expansion side of the compression/expansion loop 12 in a heat exchange part 12' where the loop's refrigerant is on one side of part 12' and the cathode exhaust is on the other side of part 12'. The exhaust of the fuel cell stack 7 leaves the stack at a temperature level, e.g. 70° C.–80° C., and is cooled by the cold expansion side of the compression/expansion loop 12 down to, for example, 20° C. The loop's refrigerant carries the exhaust heat Q to the loop's compression side where the refrigerant is heated up to a much higher temperature by compression. Thus, the exhaust heat is effectively transferred via the loop's hot side to the ambient at a much higher temperature level compared to its temperature at the fuel cell exit. This is indicated by a second heat exchange part 12", where the loop's refrigerant is on one side and the ambient is at the other side of part 12". The heat transfer is indicated in the figure by symbol Q and the dashed arrows in the compression/expansion loop 12.

In an embodiment of the present invention, a cooling fan 17 as used in vehicle cooling loop 18 comprising a standard vehicle radiator 16 can be used for removing the heat from the compression/expansion loop 12 so it can be cooled with an ambient air stream as indicated in FIG. 1. The fan 17 can serve for cooling both the radiator 16 and the compression/expansion loop 12.

Advantageously, the compression/expansion loop 12 is a commercially available air conditioning unit commonly employed in domestic applications. Such units are compact, cheap and reliable. Usually such units need no more than 5 kW electric power. The volume to electric power ratio of such an air conditioning unit suffices to cool the exhaust of a fuel cell stack 7, which is equipped in size and power as an APU unit. The cooling power requirements of the APU fuel cell system 6 and the cooling power generated by the compression/expansion loop 12 match well in this arrangement.

The compression/expansion loop 12 can be electrically connected to and powered by fuel cell system 6.

Figure 2:
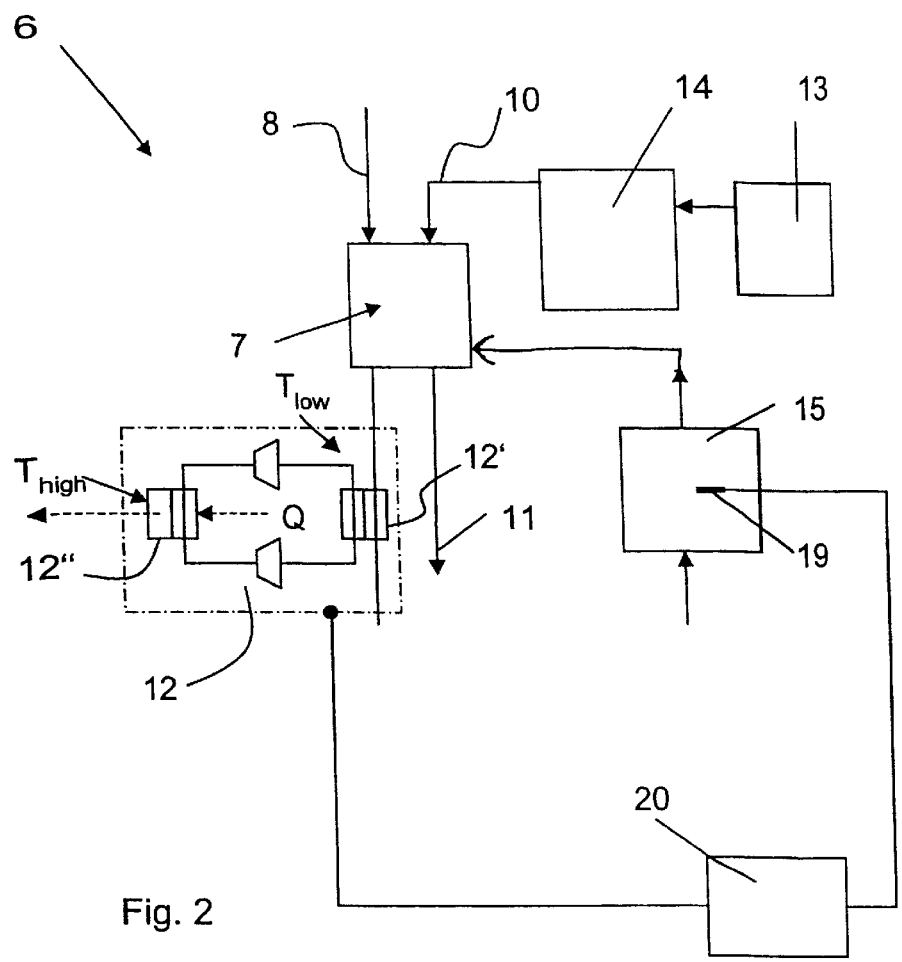
FIG. 2 shows a schematic diagram of a fuel cell system according to the present invention.
Figure 3:
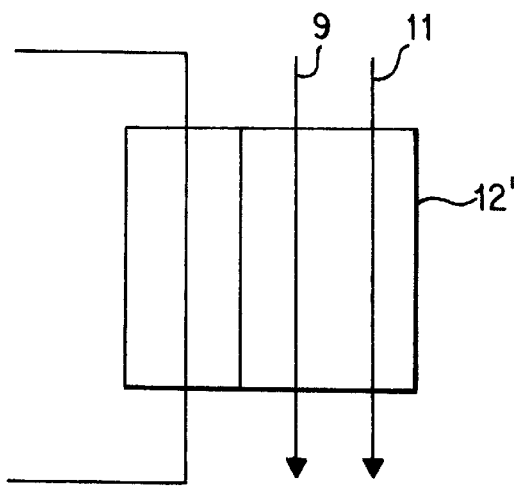
FIG. 3 is a schematic diagram of an embodiment of the expansion side of an expansion/compression loop according to the present invention.

FIG. 2 shows a detail of an arrangement of the fuel cell system 6. Elements equivalent to those in FIG. 1 are referred to with the same reference numbers. A medium is stored in a fuel tank 13. Hydrogen is extracted from the medium in unit 14 and supplied to the anode of the fuel cell stack 7 via the anode input line 10. The anode exhaust is removed by the anode exhaust line 11. Air is supplied to the cathode of the fuel cell stack 7 via the input line 8 and the exhaust is removed by the cathode exhaust line 9. Inside the fuel cell stack 7, process water is formed which easily vaporizes and is carried away to a high extent as water vapor. The exhaust is cooled by thermal conduction by the cold expansion side of the compression/expansion loop 12 down to low temperatures where much of the water vapor carried by the cathode exhaust is liquified. After cooling down, liquid water is collected in a water separator 15 and removed from the exhaust. The water can be collected in a water storage tank and recycled to the fuel cell system. The storage tank can be integrated in the water separator 15.

By using a regular air conditioner as the compression/expansion loop 12, the exhaust of the fuel cell stack 7 can easily be cooled from a typical temperature of 80° C. down to, for example, 20° C. or less by heat exchange with the cold expansion side of the compression/expansion loop 12, whereas the refrigerant medium of the compression/expansion loop 12 is heated up.

By expansion in the expansion/compression loop 12, the loop's refrigerant can be cooled down to less than 10° C. By compression in the compression/expansion loop 12, the refrigerant is heated up to a temperature much higher than the cathode exhaust temperature, up to, for example, 130° C. At this high temperature, the hot compression side of the compression/expansion loop 12 is in heat exchange preferably with the ambient atmosphere. As the temperature difference between the hot compression side and the ambient atmosphere is much larger than the temperature difference between the cathode exhaust and the ambient atmosphere, the heat transfer from the hot compression side to the ambient is increased and much more efficient than before. Therefore, even if the ambient temperature is about 45° C., the exhaust medium can be cooled down to, for example, about 20° C. via compression/expansion loop 12. As the cathode exhaust is cooled down to very low temperatures, much of the water vapor contained in the exhaust condenses. The condensed water can be removed from the exhaust by passing the exhaust through the water separator 15 and can be recycled into the fuel cell system 6. Water removal in the system is increased and there is no need of an additional water tank for humidification of the APU system.

The cooling power of the compression/expansion loop 12 can be chosen to produce enough liquid water to maintain water balance. For vehicles equipped with APU-fuel-cell-systems an on-board water tank for supplying water to the fuel cell system 6 can be minimized in volume and weight and there is no need to refill the water tank.

In an embodiment, the cooling power of compression/expansion loop 12 is varied in dependence of the water level in the water tank and/or the water separator 15. Preferably, a water level sensor 19 is used to produce a control signal for a control unit 20 which adjusts the cooling capacity of the compression/expansion loop 12. If the water level is high, the cooling power can be reduced; if the water level is low, the cooling power can be increased. This allows for optimizing the electric power consumption of the compression/expansion loop 12.

By taking advantage of the energy lever performed by the compression/expansion loop 12, this process can recover process water out of the cathode exhaust very effectively without significant increase in energy costs and requirements, or significant increase in component volume or weight. Water balance can be maintained using less energy and producing far less noise and vibration than with a straight gas compression cycle. It also allows the fuel cell and the fuel processor to operate at ambient pressure, greatly reducing the complexity of ancillary support equipment.

The use of a commercial air conditioning unit as expansion/compression loop 12 is advantageous for the APU-fuel-cell system 6 as the air conditioning system does not scale. Typically, for air conditioning the load is rather low and the ratio of electric power to cooling power is about 3:1. For example, in a standard air conditioning system 1 kW electric power is used to remove 3 kW of heat. The use of such an air conditioning unit is favorable for water removal in small APU systems compared to large fuel cell systems which deliver enough electric energy for traction applications. The usual hardware used to compress the cathode air, which is the regular method for improving water removal known in the art in large systems, is not scaleable, so that it is too large and energy inefficient for small APU systems, whereas for larger systems it is smaller and more efficient than the equivalent compression/expansion loop 12. Therefore, the use of the compression/expansion loop 12 with a low pressure fuel cell is particularly advantageous for improving water removal in small APU systems delivering a few kW electric energy. For a large fuel cell system delivering several 10 kW, preferably more than 70 kW, it is more reasonable to compress the inlet air and hydrogen.

Because of the relatively low quantities of energy involved and the use of liquids for heat exchange, the required hardware is of low volume and weight, requiring only (1) the compressor for the refrigerant liquid; (2) the already existent pumps for the vehicle and the fuel cell cooling loops; and (3) a single fan for the vehicle cooling loop. This also allows the fuel cell stack 7 to exhaust the cathode exhaust heat at an elevated ambient temperature, which is extremely important for vehicle operation in high temperature environments in summer or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
    a traction unit capable of delivering mechanical power for driving the vehicle;
    electric loads;
    a fuel cell system for supplying said electric loads with electric power, said fuel cell system comprising a fuel cell stack having an anode input line, an anode exhaust line, a cathode input line, and a cathode exhaust line; and
    a compression/expansion loop in said cathode exhaust line,
    wherein an expansion side of the compression/expansion loop is in thermal contact with the cathode exhaust line to cool the cathode exhaust and to transfer the heat of the exhaust to a compression side of said compression/expansion loop.

2. A vehicle according to claim 1, further comprising a water separator arranged in said cathode exhaust line for collecting water that is condensed from said cathode exhaust.

3. A vehicle according to claim 2, further comprising a recycle line for said water to the fuel cell system.

4. A vehicle according to claim 1, wherein said compression/expansion loop is also in said anode exhaust line.

5. A vehicle according to claim 1, wherein said compression/expansion loop requires no more than 5 kW electric power.

6. A vehicle according to claim 1, wherein said compression/expansion loop is an air conditioning unit.

7. A vehicle according to claim 1, wherein said compression/expansion loop is electrically connected to the fuel cell system.

8. A vehicle according to claim 1, wherein said fuel cell system comprises a non-pressurized fuel cell.

9. A vehicle according to claim 1, further comprising at least one of a water separator or a water tank in at least one of the cathode or anode exhaust lines downstream the compression/expansion loop.

10. A vehicle according to claim 9, further comprising a water level sensor arranged in the at least one of a water separator or a water tank.

11. A vehicle according to claim 1, further comprising a control unit connected to the compression/expansion loop to control the cooling power of the compression/expansion loop depending on the amount of water in the at least one of a water separator or a water tank.

12. A method for operating a vehicle, comprising:
    cooling a fuel cell exhaust by a compression/expansion loop;
    transferring heat from the fuel cell exhaust to an expansion side of the compression/expansion loop;
    transferring heat from the expansion side to a compression side of the compression/expansion loop;
    removing heat from the compression/expansion loop at a higher temperature level than the exhaust teperature;
    condensing water in a fuel cell exhaust line; and
    recycling the condensed water to the fuel cell system.

13. A method according to claim 12, further comprising adjusting a cooling capacity of the compression/expansion loop according to a water level sensor signal in a water storage container.

14. A method according to claim 12, further comprising controlling the cooling power of the compression/expansion loop by a control unit that is connected to the compression/expansion loop depending on an amount of water in at least one of a water separator or a water tank.

* * * * *